United States Patent
Nakamura et al.

(10) Patent No.: US 11,882,015 B2
(45) Date of Patent: Jan. 23, 2024

(54) ESTIMATION SYSTEM, ADDITION APPARATUS, ESTIMATION METHOD, ADDITION METHOD, ESTIMATION PROGRAM AND ADDITION PROGRAM

(71) Applicant: Nippon Telegraph and Telephone Corporation, Tokyo (JP)

(72) Inventors: Mizuto Nakamura, Musashino (JP); Toshihiko Seki, Musashino (JP); Naoyuki Tanji, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/624,036

(22) PCT Filed: Jul. 1, 2019

(86) PCT No.: PCT/JP2019/026144
§ 371 (c)(1),
(2) Date: Dec. 30, 2021

(87) PCT Pub. No.: WO2021/001893
PCT Pub. Date: Jan. 7, 2021

(65) Prior Publication Data
US 2022/0393959 A1    Dec. 8, 2022

(51) Int. Cl.
*H04L 43/10*    (2022.01)
*H04L 43/0852*    (2022.01)

(52) U.S. Cl.
CPC .......... *H04L 43/10* (2013.01); *H04L 43/0852* (2013.01)

(58) Field of Classification Search
None
See application file for complete search history.

(56) References Cited

U.S. PATENT DOCUMENTS

2004/0093408 A1* 5/2004 Hirani ................ H04L 41/12
709/224

FOREIGN PATENT DOCUMENTS

JP    5695767    2/2015
JP    5723334    4/2015

OTHER PUBLICATIONS

Nakamura et al., "A study on estimation accuracy improvement method of topology estimation using traffic information," 2019 IEICE General Conference, Mar. 19, 2019, 3 pages (with English Translation).

* cited by examiner

*Primary Examiner* — Scott B Christensen
(74) *Attorney, Agent, or Firm* — Fish & Richardson P.C.

(57) ABSTRACT

In an estimation system 100 including an addition device 1 and an estimation device 3, the addition device 1 includes a storage section 11 which stores address information of each interface of one of at least two network devices connected to each other, and a transmission section 16 which transmits, at different times, a PING packet which is output to the other network device and is then returned to the one of the network devices to each interface of the one of the network devices by using the address information of the interface read from the storage section, and the estimation device 3 includes an estimation section 34 which compares, for each time, time-series data of a data amount of each interface of the one of the network devices which includes a data amount of the PING packet and time-series data of a data amount of each interface of the other network device which includes the data amount of the PING packet, and calculates a combination of the interfaces of which the data amounts at each time match each other.

9 Claims, 7 Drawing Sheets

ESTIMATION SYSTEM, ADDITION APPARATUS, ESTIMATION METHOD, ADDITION METHOD, ESTIMATION PROGRAM AND ADDITION PROGRAM

CROSS-REFERENCE TO RELATED APPLICATIONS

This application is a National Stage application under 35 U.S.C. § 371 of International Application No. PCT/JP2019/026144, having an International Filing Date of Jul. 1, 2019, the disclosure of which is considered part of the disclosure of this application, and is incorporated in its entirety into this application.

TECHNICAL FIELD

The present invention relates to an estimation system, an addition device, an estimation method, an addition method, an estimation program, and an addition program.

BACKGROUND ART

Conventionally, in a plurality of network devices which are connected to each other, a technique of grasping a correct connection relationship (topology) between individual interfaces is present. For example, there is known a method of grasping the connection relationship based on a correlation between the traffic amounts of the individual interfaces (PTL 1 and PTL 2). In addition, there is known a method of estimating the connection relationship by creating a feature amount in traffic by adding packets having different data amounts to the individual interfaces in the case where characteristic change is not observed in the traffic amounts of the individual interfaces such as the case of network devices in an inactive system (NPL 1).

CITATION LIST

Patent Literature

[PTL 1] Japanese Patent No. 5695767
[PTL 2] Japanese Patent No. 5723334

Non Patent Literature

[NPL 1] Nakamura, and three others, "*Trafuikku Zyouhou wo motiita Toporozisuitei ni okeru Suiteiseido Kouzyo-syuhou no Kentou* (Study on method of improving estimation accuracy in topology estimation using traffic information)", the 2019 IEICE General Conference, B-14-11, March 2019.

SUMMARY OF THE INVENTION

Technical Problem

In the case where the packet is added to the interface as in NPL 1, a traffic generator (traffic addition device) is used in general. However, according to NPL 1, the packet is added to each of a plurality of adjacent network devices, and hence a problem arises in that a large amount of resource (a CPU, a memory, and the like) of the addition device is consumed. Normally, between a plurality of server devices and a plurality of user terminals, a large number of network devices are present hierarchically. Consequently, according to the method in NPL 1, it follows that the packets are added to all of the network devices, and efficiency in addition processing of the packet in the addition device is low.

The present invention has been made in view of the above circumstances, and an object thereof is to provide a technique capable of efficiently estimating a connection relationship between individual interfaces in a plurality of network devices.

Means for Solving the Problem

An estimation system according to an aspect of the present invention is an estimation system including: an addition device; and an estimation device, wherein the addition device includes: a storage section which stores address information of each interface of one of at least two network devices connected to each other; and a transmission section which transmits, at different times, a PING packet which is output to the other network device and is then returned to the one of the network devices to each interface of the one of the network devices by using the address information of the interface read from the storage section, and the estimation device includes an estimation section which compares, for each time, time-series data of a data amount of each interface of the one of the network devices which includes a data amount of the PING packet and time-series data of a data amount of each interface of the other network device which includes the data amount of the PING packet, and calculates a combination of the interfaces of which the data amounts at each time match each other.

An addition device according to an aspect of the present invention is an addition device including: a storage section which stores address information of each interface of one of at least two network devices connected to each other; and a transmission section which transmits, at different times, a PING packet which is output to the other network device and is then returned to the one of the network devices to each interface of the one of the network devices by using the address information of the interface read from the storage section.

An estimation method according to an aspect of the present invention is an estimation method performed with an addition device and an estimation device, wherein the addition device performs: a step of storing address information of each interface of one of at least two network devices connected to each other in a storage section; and a step of transmitting, at different times, a PING packet which is output to the other network device and is then returned to the one of the network devices to each interface of the one of the network devices by using the address information of the interface read from the storage section, and the estimation device performs: a step of comparing, for each time, time-series data of a data amount of each interface of the one of the network devices which includes a data amount of the PING packet and time-series data of a data amount of each interface of the other network device which includes the data amount of the PING packet, and calculating a combination of the interfaces of which the data amounts at each time match each other.

An addition method according to an aspect of the present invention is an addition method performed with an addition device, the addition method including: a step of storing address information of each interface of one of at least two network devices connected to each other in a storage section; and a step of transmitting, at different times, a PING packet which is output to the other network device and is then returned to the one of the network devices to each interface of the one of the network devices by using the address information of the interface read from the storage section.

An aspect of the present invention is an estimation program which causes a computer to function as the above-described estimation system.

An aspect of the present invention is an addition program which causes a computer to function as the above-described addition device.

Effects of the Invention

According to the present invention, it is possible to provide the technique capable of efficiently estimating the connection relationship between the individual interfaces in the plurality of network devices.

BRIEF DESCRIPTION OF DRAWINGS FIG. 1 is a configuration diagram showing an entire estimation system of an embodiment in the present invention.

DESCRIPTION OF EMBODIMENTS

Figure 1:
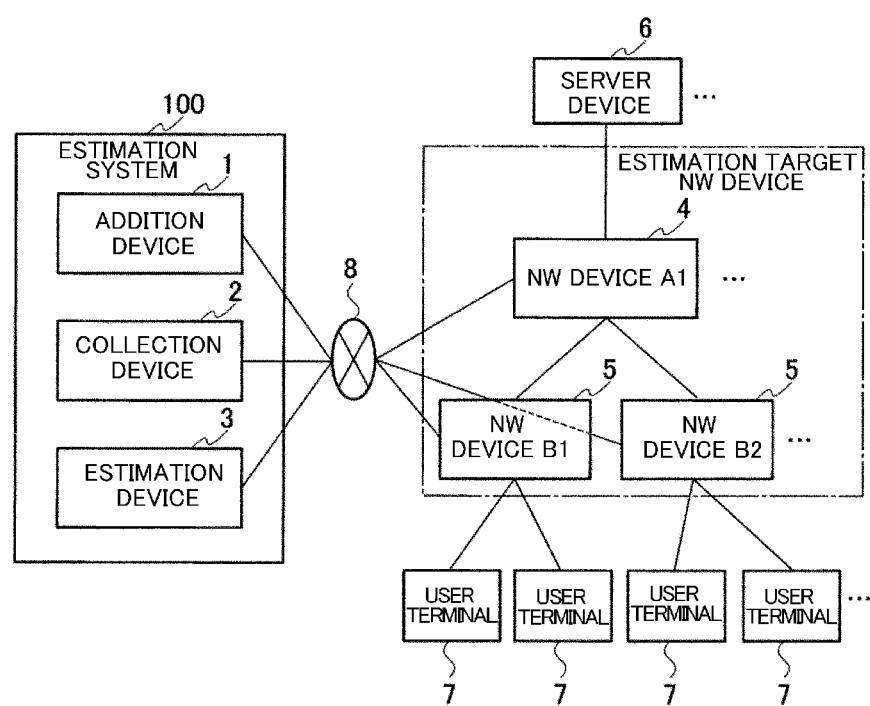

Hereinbelow, an embodiment of the present invention will be described with reference to the drawings. In the description of the drawings, the same parts are designated by the same reference numerals, and the description thereof will be omitted.

[Outline]

In the present embodiment, instead of adding a packet to each of a plurality of adjacent network devices, the packet is added only to one of the adjacent network devices. At this point, in the present embodiment, a PING packet is used as an addition packet to be added. PING has a mechanism in which, in response to an "Echo Request" packet, an "Echo Reply" packet having the same size as that of the "Echo Request" packet is returned. For example, when the PING packet is transmitted in a downward direction between a plurality of the network devices, it follows that traffic having the same size flows in an upward direction at the same timing.

That is, in the present embodiment, a relationship of "Echo Request/Echo Reply" of the PING is utilized, and hence it is possible to give features to traffics in both directions by traffic application in one direction. It is only required that the PING packet is transmitted only from one of the network devices, and hence it is not necessary to add the packet to each of the plurality of the network devices, and the rate of use of resource of an addition device which is required for addition processing of the addition packet can be reduced. In addition, it becomes possible to reduce the trouble of setting when traffic is applied, and it also becomes possible to reduce network load by preventing excessive traffic application.

[Entire Configuration of Estimation System]

FIG. 1 is a configuration diagram showing an entire estimation system 100 in the embodiment of the present invention. The estimation system 100 includes an addition device 1, a collection device 2, and an estimation device 3. The addition device 1, the collection device 2, and the estimation device 3 are connected to each other so as to be able to communicate with each other via a communication network 8. In addition, the addition device 1, the collection device 2, and the estimation device 3 are connected to a plurality of network devices 4 on a server side and a plurality of network devices 5 on a user side so as to be able to communicate with the network devices 4 and 5 via the communication network 8.

The plurality of network devices 4 on the server side and the plurality of network devices 5 on the user side are disposed hierarchically between a plurality of server devices 6 and a plurality of user terminals 7, and are connected to each other so as to be able to communicate with each other. The plurality of network devices 4 on the server side and the plurality of network devices 5 on the user side transfer packets from the user terminals 7 to predetermined server devices 6, and transfer packets from the server devices 6 to predetermined user terminals 7.

In the present embodiment, the network device 4 on the server side and the network device 5 on the user side serve as estimation targets for estimation of a connection relationship (topology) between interfaces. Note that each of the network device 4 on the server side and the network device 5 on the user side is, e.g., router equipment or switch equipment.

[Configuration of Addition Device]

Figure 2:
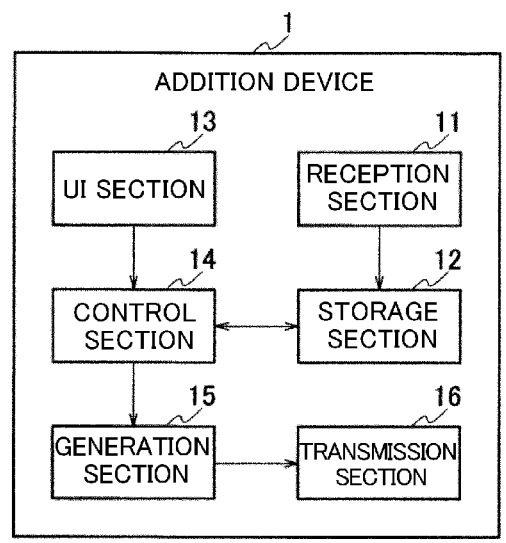
FIG. 2 is a block diagram showing the configuration of an addition device.

FIG. 2 is a block diagram showing the configuration of the addition device 1. The addition device 1 includes a reception section 11, a storage section 12, a UI section 13, a control section 14, a generation section 15, and a transmission section 16.

The reception section 11 includes the function of receiving interface information of the network device 4 on the server side serving as a topology estimation target, and interface information of the network device 5 on the user side serving as a topology estimation target from the estimation device 3. The reception section 11 may receive only the interface information of the network device 4 on the server side, or may also receive only the interface information of the network device 5 on the user side.

The storage section 12 includes the function of storing the interface information of the network device 4 on the server side and the interface information of the network device 5 on the user side which are received by the reception section 11. The storage section 12 may store only the interface information of the network device 4 on the server side, or may also store only the interface information of the network device 5 on the user side. Note that the interface information is, e.g., an IP address set in the interface.

The UI section 13 includes the function of providing an interface for a user to input data. For example, the UI section 13 displays a screen for receiving input of a data amount of the addition packet used for estimating the topology in a display.

The control section 14 includes the function of determining the IP address of a destination to which the addition packet is transmitted by using the interface information stored in the storage section 12. That is, the control section 14 determines the network device to which the addition packet is to be transmitted, and the IP address of each interface to which the addition packet is to be transmitted in the network device.

The generation section 15 includes the function of generating, based on the data amount of the addition packet input to the UI section 13, a PING (Internet Control Message Protocol) packet corresponding to the addition packet having the data amount.

The transmission section 16 includes the function of transmitting, at different times, the PING packet generated by the generation section 15 to the interface having each IP address determined by the control section 14. That is, the transmission section 16 transmits, at different times, the PING packet having a predetermined data amount input by the user to each interface of the network device determined by the control section 14.

[Configuration of Collection Device]

Figure 3:
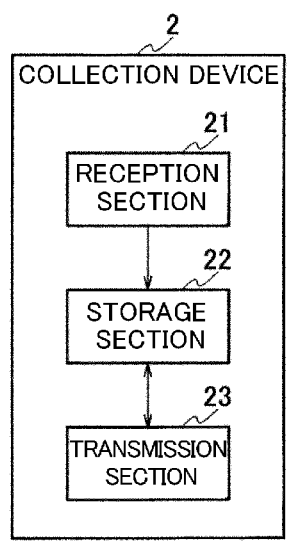
FIG. 3 is a block diagram showing the configuration of a collection device.

FIG. 3 is a block diagram showing the configuration of the collection device 2. The collection device 2 includes a reception section 21, a storage section 22, and a transmission section 23.

The reception section 21 includes the function of receiving data amounts of packets which are input to and output from each interface of the network device 4 on the server side, and data amounts of packets which are input to and output from each interface of the network device 5 on the user side.

For example, the collection device 2 performs setting of processing of automatically transmitting the packet to the collection device 2 in the communication network 8 or the network device 4 on the server side and the network device 5 on the user side. Subsequently, the reception section 21 receives the packet transmitted from a communication network side. In addition, the collection device 2 may input a command for acquiring the packet as needed to acquire the packet through the communication network 8.

The storage section 22 includes the function of storing time-series data of the data amounts of the packets which are input to and output from each interface of the network device 4 on the server side which are received by the reception section 21, and time-series data of the data amounts of the packets which are input to and output from each interface of the network device 5 on the user side which are received by the reception section 21.

The transmission section 23 includes the function of transmitting, in response to a request from the estimation device 3, the time-series data of the data amounts of the packets which are input to and output from each interface of the network device 4 on the server side, and the time-series data of the data amounts of the packets which are input to and output from each interface of the network device 5 on the user side.

[Configuration of Estimation Device]

Figure 4:
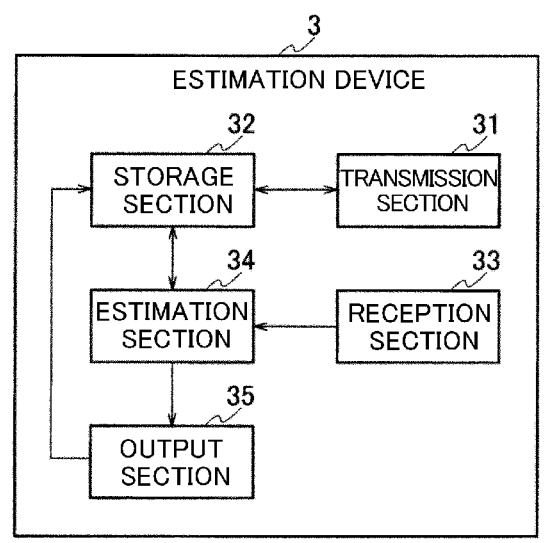
FIG. 4 is a block diagram showing the configuration of an estimation device.

FIG. 4 is a block diagram showing the configuration of the estimation device 3. The estimation device 3 includes a transmission section 31, a storage section 32, a reception section 33, an estimation section 34, and an output section 35.

The transmission section 31 includes the function of transmitting, in response to a request from the addition device 1, the interface information of the network device 4 on the server side serving as the topology estimation target and the interface information of the network device 5 on the user side serving as the topology estimation target. The transmission section 31 may transmit only the interface information of the network device 4 on the server side, or may also transmit only the interface information of the network device 5 on the user side.

The storage section 32 includes the function of storing the interface information of the network device 4 on the server side and the interface information of the network device 5 on the user side.

The reception section 33 includes the function of receiving, from the collection device 2, the time-series data of the data amounts of the packets which are input to and output from each interface of the network device 4 on the server side which include the data amount of the above PING packet, and the time-series data of the data amounts of the packets which are input to and output from each interface of the network device 5 on the user side which include the data amount of the above PING packet.

The estimation section 34 includes the function of estimating the topology between the individual interfaces in the network device 4 on the server side and the network device 5 on the user side. That is, the estimation section 34 includes the function of comparing, for each time, the time-series data of each interface of the network device 4 on the server side and the time-series data of each interface of the network device 5 on the user side which are received by the reception section 33, and calculating a combination of the interfaces of which the data amounts at each time match each other.

The output section 35 includes the function of outputting a result of estimation of the topology performed by the estimation section 34 to a printer, displaying the result thereof in the display, and storing the result thereof in the storage section 32.

[Operation of Estimation System]

Figure 5:
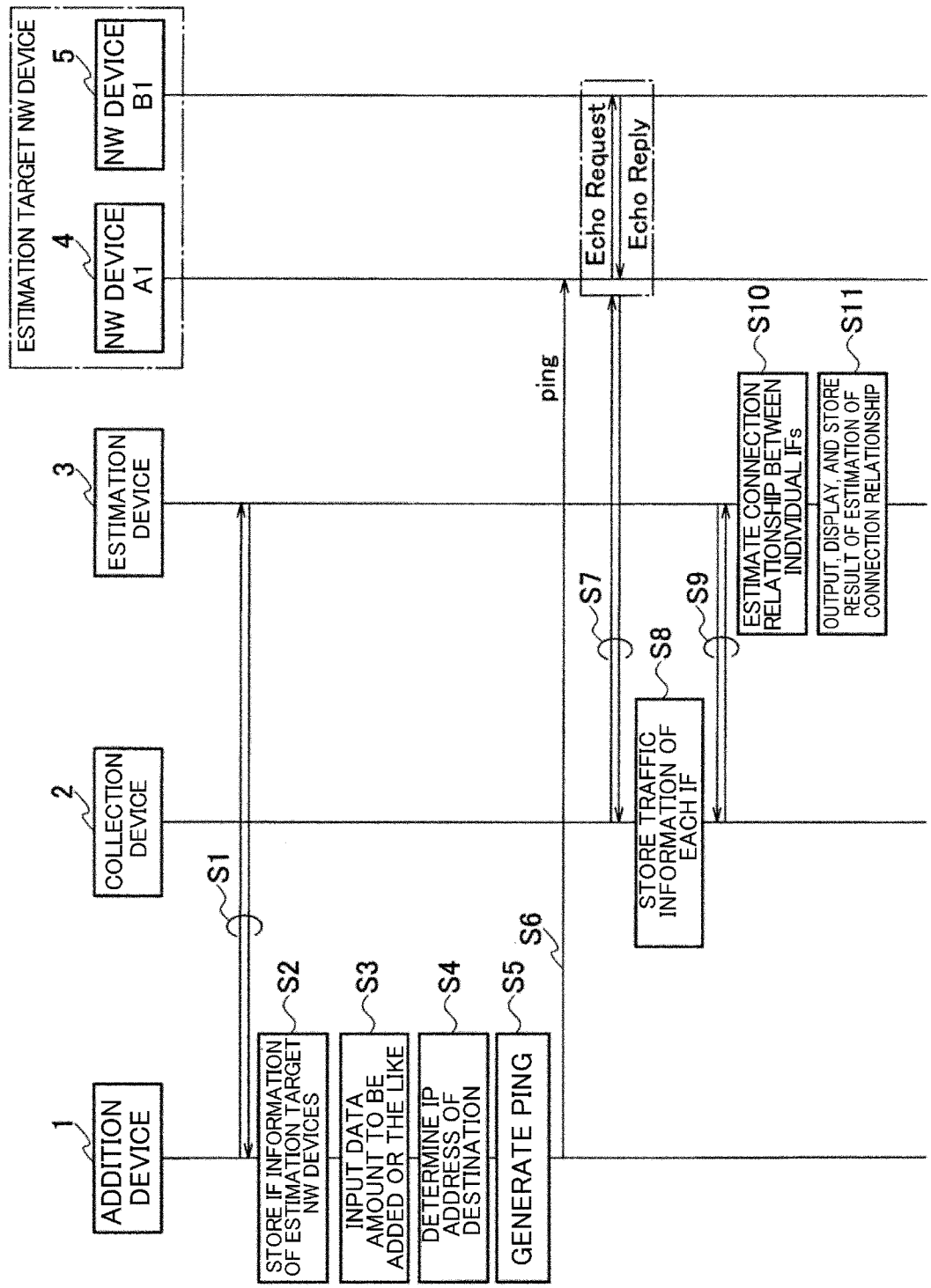
FIG. 5 is a sequence showing an example of an operation of an estimation system.

FIG. 5 is a sequence showing an example of the operation of the estimation system.

Step S1;

The addition device 1 acquires the interface information of the network devices serving as the topology estimation targets from the estimation device 3. For example, the reception section 11 receives the IP address of each interface of the network device 4 on the server side, and the IP address of each interface of the network device 5 on the user side from the estimation device 3.

Step S2;

Next, the addition device 1 stores the acquired interface information of the network devices. For example, the storage section 12 stores the IP address of each interface of the network device 4 on the server side and the IP address of each interface of the network device 5 on the user side which are received in Step S1.

Step S3;

Next, the addition device 1 receives the input of the data amount of the addition packet which is used for estimating the topology. For example, the data amount of the addition packet input by the user is input to the UI section 13.

Step S4;

Next, the addition device 1 determines the IP address of the destination to which the addition packet is transmitted. For example, out of the network device 4 on the server side and the network device 5 on the user side, the network device 4 on the server side which is positioned at a higher level is determined to be the network device serving as the destination of the addition packet by the control section 14. Subsequently, the control section 14 refers to the IP address of each interface of the network device 4 on the server side from the storage section 12 and, among the interfaces connected to the server device 6 and the interfaces connected to the network device 5 on the user side, each interface connected to the network device 5 on the user side is determined to be the interface serving as the destination of the addition packet by the control section 14.

Herein, the reason why the network device 4 on the server side positioned at the higher level is determined to be the destination of the addition packet will be explained. In general, traffic in the upward direction is less than traffic in the downward direction. Therefore, from the viewpoint of network load, it may be desirable to add the traffic to the upward direction if possible. However, the network devices are connected based on a hierarchical structure in general, and the number of network devices at a lower level is larger than the number of network devices at a higher level. Therefore, when the network device 5 on the user side which is positioned at the lower level is determined to be the destination of the addition packet, the number of destinations to which the addition packets are transmitted by the addition device 1 is increased, which is not efficient. To cope with this, in the present embodiment, the network device 4 on the server side which is positioned at the higher level is determined to be the destination of the addition packet.

Step S5;

Next, the addition device 1 generates the PING packet. For example, the generation section 15 generates, based on the data amount of the addition packet which is input in Step S3, the PING packet corresponding to the addition packet having the data amount.

Step S6;

Next, the addition device 1 transmits the generated PING packet to the network device serving as the topology estimation target. For example, the transmission section 16 transmits, at different times, the PING packet having the predetermined data amount generated in Step S5 to each interface on the user side of the network device 4 on the server side determined in Step S4.

Thereafter, the PING packet is output in the downward direction toward the network device 5 on the user side from the network device 4 on the server side, and is then returned in the upward direction toward the network device 4 on the server side from the network device 5 on the user side.

That is, the addition device 1 transmits, at different times, the PING packet which is output in the downward direction toward the network device 5 on the user side and is then returned in the upward direction toward the network device 4 on the server side to each interface of the network device 4 on the server side.

Figure 6:
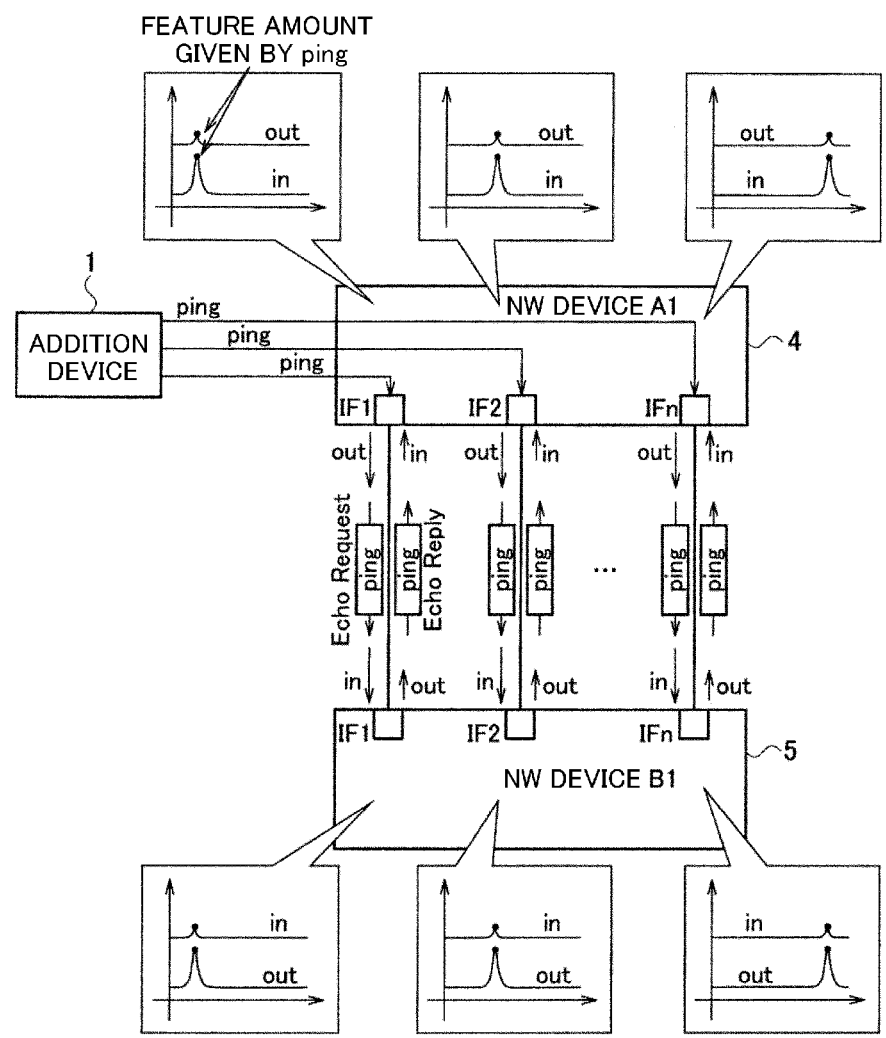
FIG. 6 is a view showing an image of an addition method.

With this, the time-series data of the data amounts of the packets which are input to and output from each interface of the network device 4 on the server side and the time-series data of the data amounts of the packets which are input to and output from each interface of the network device 5 on the user side are as shown in, e.g., FIG. 6. It follows that, to the interfaces which are in the connection relationship in the network device 4 on the server side and the network device 5 on the user side, the same feature amounts are given in the upward direction and the downward direction at the same timing by the PING packet.

Step S7;

Next, the collection device 2 receives the data amounts which are input to and output from each interface of the network device 4 on the server side and the network device 5 on the user side. For example, the reception section 21 receives the data amounts of the packets which are input to and output from each interface of the network device 4 on the server side and the data amounts of the packets which are input to and output from each interface of the network device 5 on the user side.

Step S8;

Next, the collection device 2 stores the time-series data of the received data amounts. For example, the storage section 22 stores the time-series data of the data amounts of the packets which are input to and output from each interface of the network device 4 on the server side which are received in Step S7 and the time-series data of the data amounts of the packets which are input to and output from each interface of the network device 5 on the user side which are received in Step S7.

Step S9;

Next, the estimation device 3 acquires the data amounts which are input to and output from each interface of the network device 4 on the server side and the network device 5 on the user side from the collection device 2. For example, the reception section 33 receives the time-series data of the data amounts of the packets which are input to and output from each interface of the network device 4 on the server side which include the data amount of the PING packet and the time-series data of the data amounts of the packets which are input to and output from each interface of the network device 5 on the user side which include the data amount of the PING packet.

Step S10;

Next, the estimation device 3 estimates the topology between the individual interfaces. For example, the estimation section 34 compares, for each time, the time-series data of each interface of the network device 4 on the server side and the time-series data of each interface of the network device 5 on the user side which are received in Step S9, and calculates a combination of the interfaces of which the data amounts at each time match each other. Specifically, in the case where traffic data is acquired at intervals of one hour, pieces of data at each time such as the data amounts at 0 o'clock, the data amounts at 1 o'clock, . . . , are compared, and a pair of the interfaces of which the pieces of data at each time match each other is identified (see FIG. 7).

Step S11;

Lastly, the estimation device 3 outputs the result of estimation of the topology. For example, the output section 35 outputs the result of estimation of the topology performed in Step S10 to the printer, displays the result thereof in the display, and stores the result thereof in the storage section 32.

Figure 7:
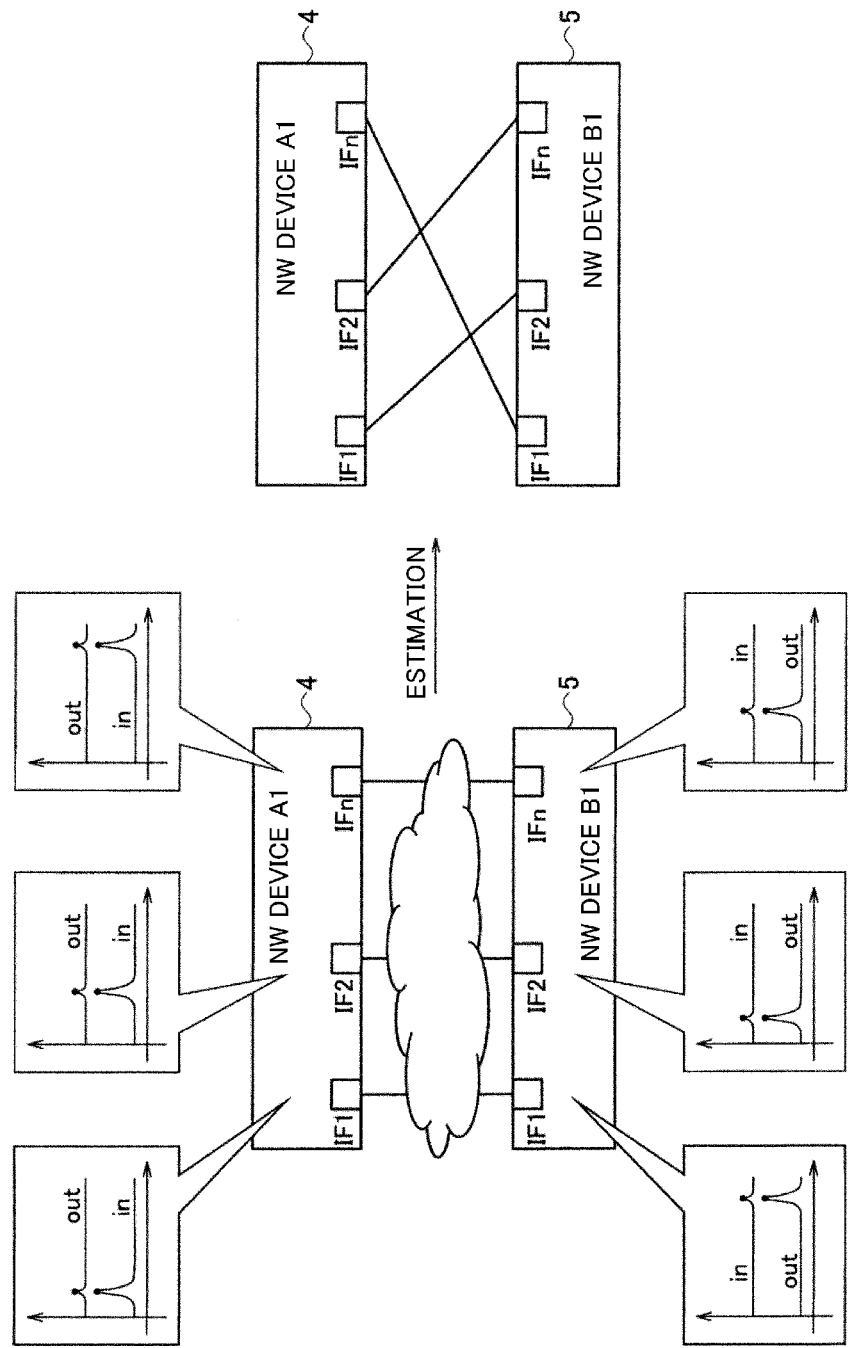
FIG. 7 is a view showing an image of an estimation method.

Note that, in FIGS. 6 and 7, the description has been made by using, as an example, the case where the network device serving as the topology estimation target is an inactive system (the data amount is not changed from one interface to another), but the packet addition method and the topology estimation method described in the present embodiment can also be applied to an active system in which the data amount is changed from one interface to another.

[Effect]

In the present embodiment, the addition device 1 includes the storage section 12 which stores the address information of each interface of one of the network device 4 on the server side and the network device 5 on the user side which are connected to each other, and the transmission section 16 which transmits, at different times, the PING packet which is output to the other network device and is then returned to one of the network devices to each interface of one of the network devices by using the address information of each interface read from the storage section 12, and the estimation device 3 includes the estimation section 34 which compares, for each time, the time-series data of the data amount of each interface of one of the network devices which includes the data amount of the PING packet and the time-series data of the data amount of each interface of the other network device which includes the data amount of the PING packet, and calculates the combination of the interfaces of which the data amounts at each time match each other. Accordingly, in the present embodiment, processing of adding the packet to each of a plurality of adjacent network devices is not necessary, and hence it is possible to reduce the rate of use of resource of the addition device related to the addition processing of the addition packet. In addition, in the present embodiment, it is possible to reduce the trouble of setting for application of traffic, and reduce network load by preventing excessive traffic application.

In addition, in the present embodiment, the addition device 1 transmits, at the different times, the above PING packet which is output in the downward direction toward the network device 5 on the user side and is then returned in the upward direction toward the network device 4 on the server side to each interface of the network device 4 on the server side. Accordingly, in the present embodiment, it is possible to further reduce the rate of use of resource of the addition device 1 related to the addition processing of the addition packet.

[Modification]

In the present embodiment, the description has been made by using, as an example, the case where the network device 4 on the server side positioned at the higher level is determined to be the destination of the addition packet by the addition device 1. On the other hand, the network device 5 on the user side positioned at the lower level may also be determined to be the destination of the addition packet by the addition device 1.

[Others]

The present invention is not limited to the above-described embodiment, and may be modified in many ways within the scope of the gist thereof.

Figure 8:
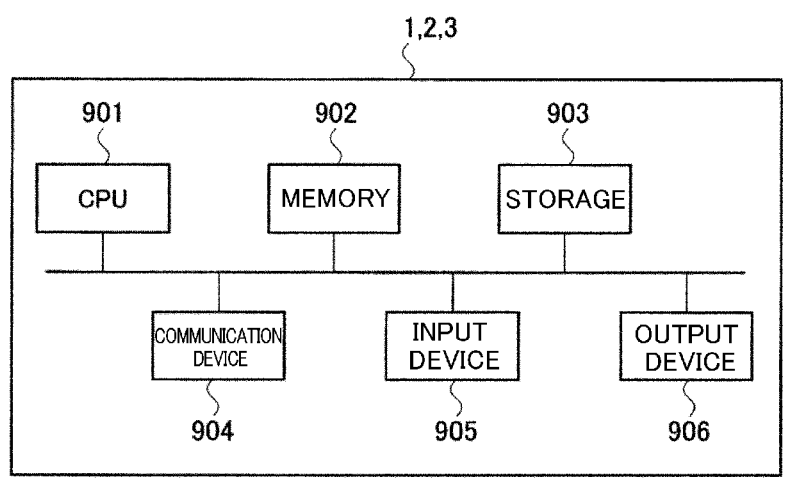
FIG. 8 is a configuration diagram of a general-purpose computer.

As the addition device 1, the collection device 2, and the estimation device 3 in the present embodiment described above, as shown in FIG. 8, it is possible to use a general-purpose computer system which includes, e.g., a CPU (Central Processing Unit, processor) 901, a memory 902, a storage (Hard Disk Drive, Solid State Drive) 903, a communication device 904, an input device 905, and an output device 906. Each of the memory 902 and the storage 903 is a storage device. The CPU 901 executes a predetermined program loaded onto the memory 902 in this computer system, and the functions of the addition device 1, the collection device 2, and the estimation device 3 are thereby implemented.

Note that the addition device 1, the collection device 2, and the estimation device 3 may be implemented by one computer or may also be implemented by a plurality of computers. In addition, the addition device 1, the collection device 2, and the estimation device 3 may also be virtual machines implemented in a computer.

Programs for the addition device 1, the collection device 2, and the estimation device 3 can be stored in a computer-readable recording medium such as an HDD, an SSD, a USB (Universal Serial Bus) memory, a CD (Compact Disc), or a DVD (Digital Versatile Disc), and can also be distributed via a network.

REFERENCE SIGNS LIST

1 Addition device
2 Collection device
3 Estimation device
4 Network device on server side
5 Network device on user side
6 Server device
7 User terminal
8 Communication network
11 Reception section
12 Storage section
13 UI section
14 Control section
15 Generation section
16 Transmission section
21 Reception section
22 Storage section
23 Transmission section
31 Transmission section
32 Storage section
33 Reception section
34 Estimation section
35 Output section
100 Estimation system
901 CPU
902 Memory
903 Storage
904 Communication device
905 Input device
906 Output device

The invention claimed is:

1. An estimation system for determining a topology between a plurality of interfaces of a first network device of at least two network devices and a plurality of interfaces of a set of second network devices of the at least two network devices that are connected to each other, comprising:
   an addition device comprising:
      a storage configured to:
         store address information of (i) the plurality of interfaces of the first network device and (ii) the plurality of interfaces of the second network device,
      a processor configured to:
         determine that the first network device is to be a destination of a plurality of packets to be transmitted from the at least two network devices based on the first network device being a server-side network device and the second network device being a client-side network device, and
         generate the plurality of packets, wherein each of the plurality of packets has a different data amount, and
      a transmitter configured to:
         transmit the plurality of packets to the plurality of interfaces of the first network device, respectively, at different times, by using address information of the plurality of interfaces read from the storage, such that each interface of the plurality of interfaces receives at least one of the plurality of packets;
   the first network device comprising:
      at least one transmitter configured to:
         receive the plurality of packets and output each of the plurality of packets using the interface that received the packet toward the second network device using the plurality of interfaces, and
         receive responses for each of the plurality of packets and forward the plurality of responses to a collection device;

the set of second network devices comprising:
  at least one transmitter configured to:
    receive the plurality of packets from the first network device and responding using a same one of the plurality of interfaces of the set of second devices;
the collection device, comprising:
  at least one processor configured to:
    store data of the plurality of responses, and
  a transmitter configured to:
    transmit the stored data to an estimation device; and
an estimation device comprising:
  one or more processors configured to:
    based on the stored data, for each individual packet of the plurality of packets:
      compare data amounts of each interface of the first network device that includes a data amount of the individual packet and a data amount of each interface of the set of second network device that includes tha data amount of the individual packet, and
      calculate, based on the comparison, a combination of the interfaces of the first network device and the set of second network devices that includes the data amount of the packet to determine connection relationships between the interfaces.

2. The estimation system according to claim 1, wherein calculating the combination of the interfaces includes determining the topology based on the determined connection relationships.

3. The estimation system according to claim 2, wherein the one or more processors of the estimation device are configured to output the determined topology to a printer and display the topology on a screen.

4. An estimation method performed by an addition device having a storage, a processor, and a transmitter, a first network device having at least one transmitter, a set of second network devices having at least one transmitter, a collection device having at least one processor and a transmitter, and an estimation device comprising one or more computers for determining a topology between a plurality of interfaces of a first network device of at least two network devices and a plurality of interfaces of the set of second network devices of the at least two network devices that are connected to each other, wherein:
  the addition device performs:
    storing, in the storage, address information of i) the plurality of interfaces of the first network device and (ii) the plurality of interfaces of the second network device,
    determining, by the processor, that the first network device is to be a destination of a plurality of packets to be transmitted from the at least two network devices based on the first network device being a server-side network device and the second network device being a client-side network device,
    generating, by the processor the plurality of packets, wherein each of the plurality of packets has a different data amount, and
    transmitting, by the transmitter, the plurality of packets to the plurality of interfaces of the first network device, respectively, at different times, by using address information of the plurality of interfaces read from the storage, such that each interface of the plurality of interfaces receives at least one of the plurality of packets,
  the first network device performs:
    receiving, by the at least one transmitter, the plurality of packets and outputting each of the plurality of packets using the interface that received the packet toward the second network device using the plurality of interfaces, and
    receiving, by the at least one transmitter, responses for each of the plurality of packets and forward the plurality of responses to a collection device,
  the set of second network device performs:
    receiving, by the at least one transmitter, the plurality of packets from the first network device and responding using a same one of the plurality of interfaces of the set of second devices,
  the collection device performs:
    storing, by the at least one processor, data of the plurality of responses, and
    transmitting, by the transmitter, the stored data to the estimation device,
  the estimation device performs:
    based on the stored data, for each individual packet of the plurality of packets:
      comparing data amounts of each interface of the first network device that includes a data amount of the individual packet and a data amount of each interface of the set of second network device that includes the data amount of the individual packet, and
      calculating, based on the comparison a combination of interfaces of the first network device and the set of second network devices that includes the data amount of the packet to determine connection relationships between the interfaces.

5. The estimation method according to claim 4, wherein calculating the combination of the interfaces includes determining the topology based on the determined connection relationships.

6. The estimation method according to claim 5, further comprising outputting the determined topology to a printer and displaying the topology on a screen.

7. A non-transitory recording medium storing an estimation program for determining a topology between a plurality of interfaces of a first network device of at least two network devices and a plurality of interfaces of a set of second network devices of the at least two network devices that are connected to each other, wherein execution of the program causes one or more computers to perform operations comprising:
  storing, in a storage, address information of i) the plurality of interfaces of the first network device and (ii) the plurality of interfaces of the second network device;
  determining that the first network device is to be a destination of a plurality of packets to be transmitted from the at least two network devices based on the first network device being a server-side network device and the second network device being a client-side network device;
  generating the plurality of packets, wherein each of the plurality of packets has a different data amount;
  transmitting the plurality of packets to the plurality of interfaces of the first network device, respectively, at different times, by using address information of the plurality of interfaces read from the storage, such that each interface of the plurality of interfaces receives at least one of the plurality of packets;

receiving the plurality of packets and output each of the plurality of packets using the interface that received the packet toward the second network device using the plurality of interfaces;

receiving responses for each of the plurality of packets and forward the plurality of responses to a collection device;

receiving the plurality of packets from the first network device and responding using a same one of the plurality of interfaces of the set of second devices;

storing data of the plurality of responses;

transmitting the stored data to an estimation device; and based on the stored data, for each individual packet of the plurality of packets:

comparing data amounts of each interface of the first network device that includes a data amount of the individual packet and a data amount of each interface of the set of second network device that includes the data amount of the individual packet; and calculating, based on the comparison, a combination of interfaces of the first network device and the set of second network devices that includes the data amount of the packet to determine connection relationships between the interfaces.

8. The non-transitory recording medium according to claim 7, wherein calculating the combination of the interfaces includes determining the topology based on the determined connection relationships.

9. The non-transitory recording medium according to claim 8, wherein the operations further comprise outputting the determined topology to a printer and displaying the topology on a screen.

* * * * *